United States Patent [19]

Beasley

[11] 3,742,841
[45] July 3, 1973

[54] FATTING ATTACHMENT FOR SKINNING MACHINES
[75] Inventor: Donald L. Beasley, Des Moines, Iowa
[73] Assignee: Townsend Engineering Company, Des Moines, Iowa
[22] Filed: Mar. 4, 1971
[21] Appl. No.: 120,823

Related U.S. Application Data
[63] Continuation-in-part of Ser. No. 56,319, July 20, 1970, Pat. No. 3,674,071.

[52] U.S. Cl. .................................................. 99/589
[51] Int. Cl. ............................................. A22c 17/12
[58] Field of Search .................. 146/130; 69/9, 11, 69/13; 83/4

[56] References Cited
UNITED STATES PATENTS
2,715,427  8/1955  Townsend ............................ 146/130
3,360,026  12/1967  Schill ................................. 146/130

Primary Examiner—Willie G. Abercrombie
Attorney—Zarley, McKee & Thomte

[57] ABSTRACT

A fatting attachment for skinning machines comprising a straight disposable fatting blade mounted above the skinning blade of the machine. Adjustment means are secured to the opposite ends of the fatting blade so that the fatting blade can be moved toward and away from the skinning blade to vary the depth of the fatting blade in the fat.

6 Claims, 8 Drawing Figures

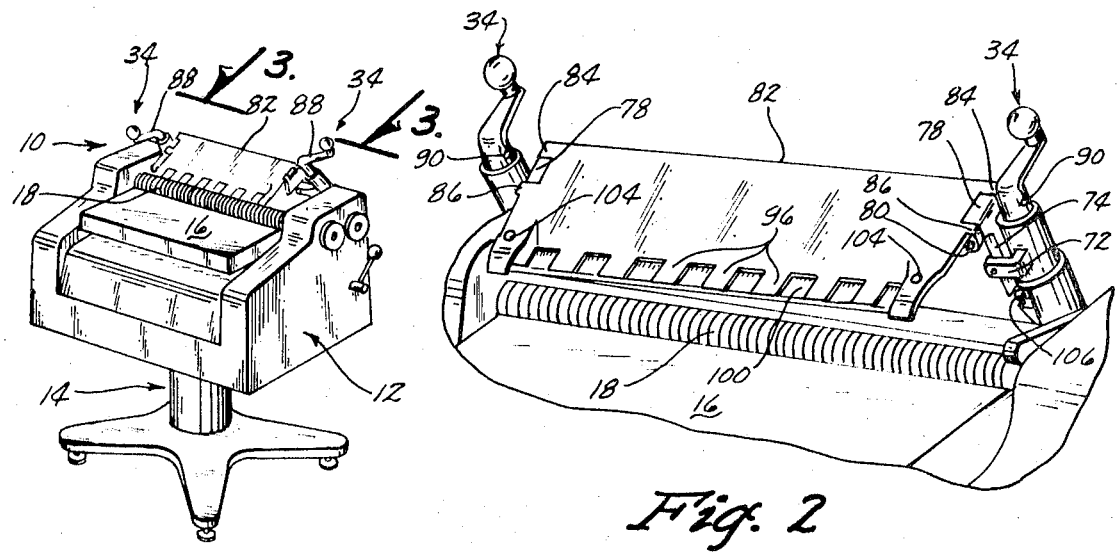
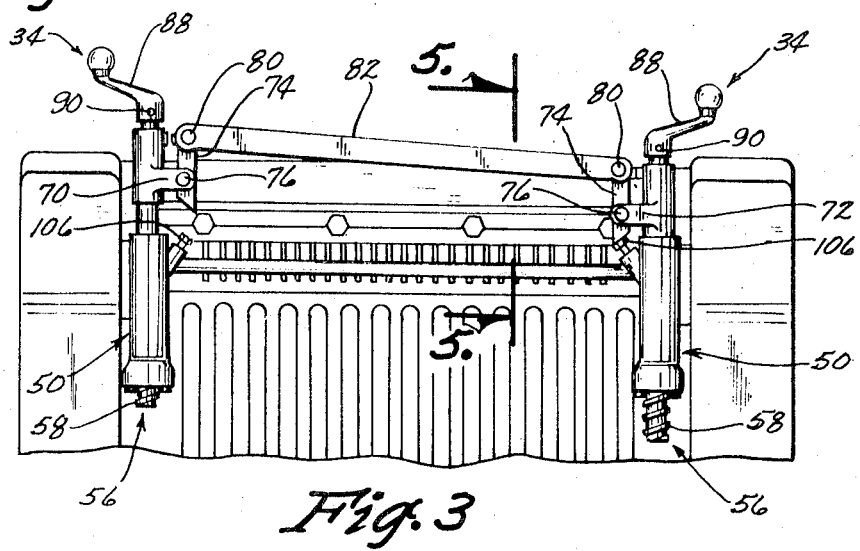
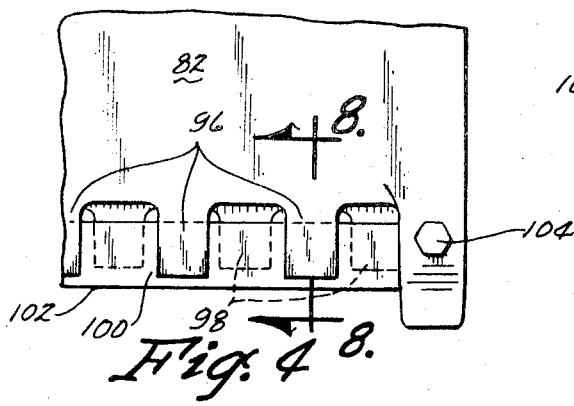
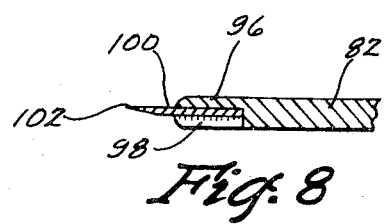
INVENTOR
DONALD L. BEASLEY

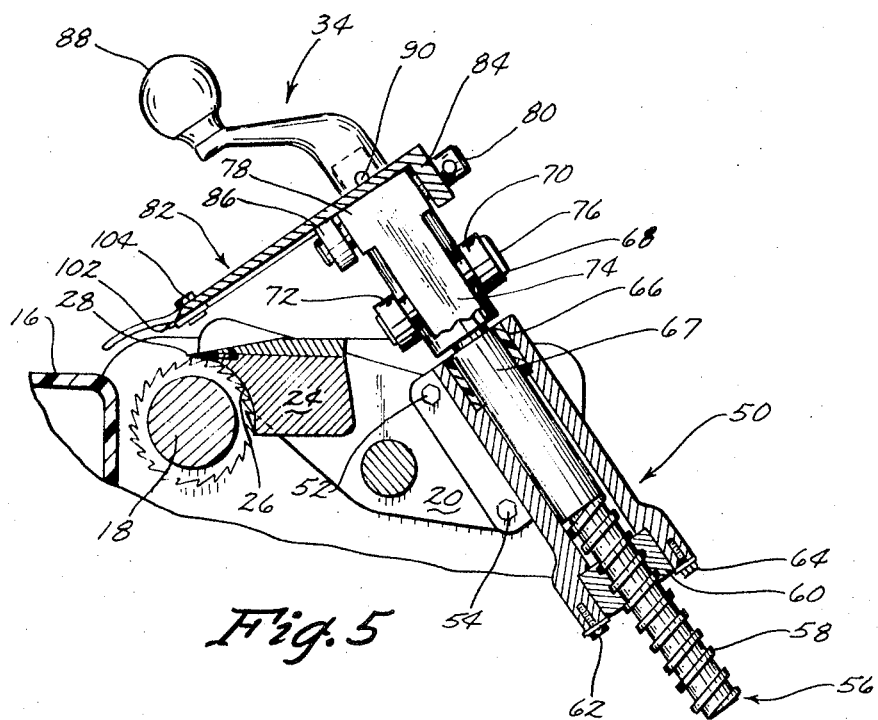
Fig. 5
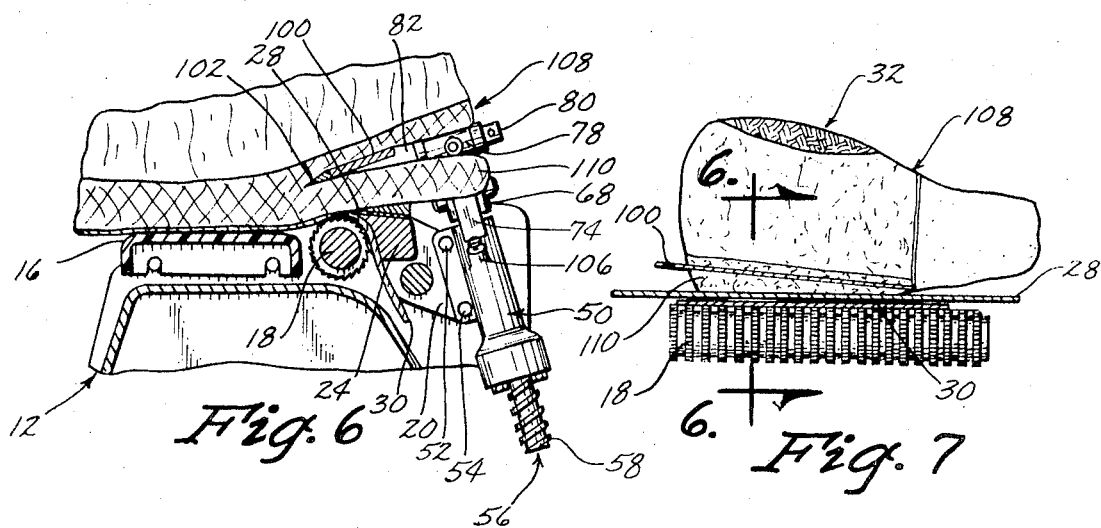
Fig. 6
Fig. 7
INVENTOR
DONALD L. BEASLEY
BY
Zarley, McKee & Thomte
ATTORNEYS

FATTING ATTACHMENT FOR SKINNING MACHINES

This application is a continuation-in-part of application Ser. No. 56,319, filed July 20, 1970, now U.S. Pat. No. 3,674,071. It relates to an improvement in the fatting attachment for the skinning machine disclosed in U.S. Pat. No. 2,715,427 of Aug. 16, 1955, and further relates to a fatting attachment for a skinning machine of the type shown in U.S. Pat. No. Re.23,222 of Apr. 25, 1950.

The present invention relates to an attachment for a skinning machine which adjustably removes a layer of fat from pork hams. The straight fatting blade of U.S. Pat. No. 2,715,427 was of the permanent type and required resharpening periodically during its use.

Therefore, it is a principal object of this invention to provide a fatting attachment for skinning machines.

A further object of this invention is to provide a fatting attachment for skinning machines including a straight disposable and replaceable fatting blade.

A further object of this invention is to provide a fatting attachment for skinning machines and means for selectively adjusting the fatting blade with respect to the skinning blade.

A further object of this invention is to provide a fatting attachment for skinning machines which permits the removal of layers of fat from pork hams.

A further object of this invention is to provide a fatting attachment for skinning machines which accommodates pork hams having varying skin and fat thicknesses.

A further object of this invention is to provide a fatting attachment for machines mechines including a straight fatting blade which is quickly adjustable toward and away from the skinning blade to vary its depth in the fat.

A further object of this invention is the provision of a fatting blade support which holds and reinforces the fatting blade.

A further object of this invention is the provision of a fatting attachment which utilizes a thinner blade than previous fatting attachments.

A further object of this invention is to provide a fatting attachment for skinning machines which is economical to manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of a skinning machine having the fatting attachment of this invention mounted thereon;

FIG. 2 is a perspective view of the fatting attachment of this invention mounted on a skinning machine;

FIG. 3 is an enlarged view as seen along lines 3 — 3 of FIG. 1;

FIG. 4 is a fragmentary top elevational view of the fatting blade;

FIG. 5 is an enlarged sectional view as seen along lines 5 — 5 of FIG. 3;

FIG. 6 is a view generally similar to FIG. 5 as seen along lines 6 — 6 of FIG. 7 illustrating the skinning blade and fatting blade removing a layer of skin and fat from a pork ham;

FIG. 7 depicts the fatting blade removing a layer of fat from the pork ham; and

FIG. 8 is a sectional view taken along line 8 — 8 of FIG. 4.

The numeral 10 refers generally to a skinning machine such as disclosed in U.S. Patent No. Re.23,222. Machine 10 generally comprises a housing 12 mounted on a pedestal 14. A feed table 16 is mounted forwardly of a feed roller 18, the roller being provided with a plurality of peripheral grooves and gripping teeth. A pair of pressure shoe supports 20 (FIGS. 5 and 6) are pivotally connected at opposite ends of feed roller 18 and each have a pressure shoe 24 secured thereto and extending therebetween. Pressure shoe 24 has an arcuate surface 26 formed at the forward end thereof which is closely positioned adjacent feed roller 18 to maintain the proper pressure on the skin being removed from the pork hams. A skinning blade 28 is supported by pressure shoe 24 and is adapted to remove the skin 30 from a pork ham 32 (FIGS. 6 and 7). Means (not shown) is provided to maintain the pressure shoe and skinning blade in the proper position with respect to feed roller 18 and skin 30.

Mounted adjacent the opposite ends of skinning blade 28 are a pair of fatter blade adjustment assemblies 34 (FIGS. 1 – 3). Each of the two assemblies 34 is identical in construction, and includes a collar 50 (FIG. 5) which is secured to the rearward end of pressure shoe support 20 by bolts 52 and 54. An adjustment screw 56 extends through collar 50 and has a threaded lower end portion 58 threadably extending through a boss 60 secured to the lower end of collar 50 by bolts 62 and 64. A bushing 66 is provided at the upper end of collar 50 and embraces an upper cylindrical portion 67 of adjustment screw 56. A yoke 68 rotatably embraces the upper end portion of screw 56 and has a pair of yoke arms 70 and 72 (FIGS. 2 and 3) extending inwardly therefrom in a spaced apart relationship. Another arm 74 is received between the yoke arms 70 and 72 and is pivotally connected thereto by means of pin 76 extending therethrough. Arm 74 has a collar 78 (FIGS. 2 and 5) provided at its upper end adapted to receive a pin 80 therein.

A fatting blade support 82 includes at its opposite ends a pair of ears 84, 86 which are pivotally connected to collars 78 of arms 74 by means of pins 80. A crank handle 88 is secured to the upper end of adjustment screw 56 by a pin 90 to provide a quick means for threadably rotating adjustment screw 56 in boss 60 to raise and lower yoke 68 (and consequently the opposite ends of blade support 82) with respect to collar 50.

Referring to FIGS. 2, 4 and 8, fatting blade support 82 includes a plurality of spaced apart upper teeth 96 and a plurality of spaced apart lower teeth 98 which are vertically spaced from upper teeth 96 and which are staggered with respect thereto.

A replaceable or disposable blade member 100 is received between the upper teeth 96 and lower teeth 98 as illustrated in FIG. 8 and has its leading edge 102 positioned forwardly thereof. Blade member 100 is secured to the fatting blade support 82 by bolts 104. Yoke 68 is limited in its downward movement by means of an adjustment screw means 106 (FIGS. 2 and 3) adapted to engage the lower end of arm 74 to prevent fatting blade support 82 from being moved too closely adjacent the skinning blade.

Referring to FIGS. 6 and 7, ham 32 is illustrated with a fat layer 108 thereon. Fat layer 108 includes a trimmed portion 110 which is being trimmed off by fatter blade 100.

As ham 32 is being fed into the machine feed roller 18 grips the skin and pulls it under blade 28. Fatting blade 100 simultaneously removes a trimmed portion of fat 110 which passes between blade 28 and blade 100 to be discharged from the right-hand edge of pressure shoe 24 as viewed in FIG. 6. The fat on ham 32 varies in thickness, being considerably thicker on the butt end (left-hand side as viewed in FIG. 7) than at the shank end of the ham. Therefore it is desirable to have the right-hand end (as seen in FIG. 7) of fatter blade 100 closer to blade 28 and the left-hand end of fatter blade 100 farther away from blade 28. Hams are right and left-handed, and therefore it is desirable to reverse the inclined position of fatter blade 100 to accommodate both right and left-handed hams. For this reason two adjustment assemblies 34 are provided at opposite ends of fatter blade 100.

Adjustment of fatting blade 100 to accommodate varying thicknesses of fat and to accommodate both left and right-handed hams can be done easily by merely rotating handles 88. Thus the operator can quickly adjust fatter blade 100 for each individual ham.

One problem encountered with previous ham fatters was the time consuming job of resharpening the fatter blade being used. Previous devices did not include a disposable blade which could easily and quickly be removed and replaced. Thus the fatting operation would have to be stopped periodically to resharpen the fatter blade. The present device provides a replaceable fatter blade 100 which can be quickly removed merely by loosening bolts 104. A new blade can be quickly slipped in place and the fatting operation can continue with a minimum of interruption and delay.

The provision of upper teeth 96 and lower teeth 98 has also greatly facilitated the quick replacement of fatter blade 100 by providing positive positioning of blade 100 as it is slipped into place. Furthermore, teeth 96, 98 provide reinforcement of blade 100 so as to permit blade 100 to be considerably thinner than in previous devices. By using a thinner blade 100, a sharper edge can be obtained.

Previous devices suspended the fatting blade at its opposite ends and did not provide a fatting blade support 82 for supporting it along its entire length such as in the present device. Thus blade support 82 provides better reinforcement of blade 100 than in previous devices, thereby permitting the use of a thinner blade 100. Without blade support 82, blade 100 would flex and bend in response to the forces exerted on it during the fatting operation.

Thus it can be seen that the attachment accomplishes at least all of its stated objectives.

I claim:

1. A fatting attachment for skinning machine, said skinning machine having an elongated skinning blade for removing the skin from a piece of meat; said fatting attachment comprising: a disposable elongated fatting blade; an elongated fatting blade support having opposite ends and opposing means for detachably holding said fatting blade; mounting means for holding and supporting said opposite ends of said fatting blade support adjacent said skinning blade; said mounting means being selectively adjustable to move said opposite ends of said blade support toward and away from said skinning blade; and said fatting blade being relatively thinner than said blade support and being reinforced against longitudinal flexing by said opposing means.

2. A fatting attachment for a skinning machine, said skinning machine having an elongated skinning blade for removing the skin from a piece of meat; said fatting attachment comprising: a disposable elongated fatting blade;
   an elongated fatting blade support having opposite ends and means for detachably holding said fatting blade;
   mounting means for holding and supporting said opposite ends of said fatting blade support adjacent said skinning blade; said mounting means being selectively adjustable to move said opposite ends of said blade support toward and away from said skinning blade;
   said fatting blade being relatively thinner than said blade support and being reinforced against longitudinal flexing by said blade support;
   said fatting blade having opposite surfaces, said blade support having a plurality of teeth embracing said opposite surfaces of said fatting blade so as to impart rigidity thereto.

3. A fatting attachment according to claim 2 wherein said plurality of teeth include a first group of spaced teeth engaging one of said opposite surfaces of said fatting blade and a second group of spaced teeth engaging the other of said opposite surfaces of said fatting blade.

4. A fatting attachment according to claim 3 wherein said first group of spaced teeth are staggered with respect to said second group of spaced teeth.

5. A fatting attachment according to claim 1 wherein said mounting means include means for limiting movement of said blade support towards said skinning blade beyond a predetermined position so as to prevent contact between said skinning and fatting blades.

6. A fatting attachment for a skinning machine, said skinning machine having an elongated skinning blade for removing the skin from a piece of meat; said fatting attachment comprising:
   a disposable elongated fatting blade;
   an elongated fatting blade support having opposite ends and means for detachably holding said fatting blade;
   mounting means for holding and supporting said opposite ends of said fatting blade support adjacent said skinning blade; said mounting means being selectively adjustable to move said opposite ends of said blade support toward and away from said skinning blade;
   said fatting blade being relatively thinner than said blade support and being reinforced against longitudinal flexing by said blade support;
   said mounting means including two fatter blade adjustment assemblies; said adjustment assemblies each having rotatable threaded members for adjusting the distance between said fatting and skinning blades;
said threaded members each being threaded within a collar which is stationarily mounted with respect to said skinning blade; said threaded members each having a yoke thereon pivotally coupled to said opposite ends of said blade support so as to permit hinged movement between said blade support and said yokes during movement of said threaded members within said collars.

* * * * *